United States Patent
Giampieretti et al.

[19]

[11] Patent Number: 6,031,187
[45] Date of Patent: Feb. 29, 2000

[54] POLE HEAD FOR SUPPORTING CONDUCTORS ON POLES FOR MEDIUM- AND HIGH-VOLTAGE OVERHEAD POWER LINES

[75] Inventors: Roberto Giampieretti; Cesare Guida; Andrea Catenacci, all of Milan, Italy

[73] Assignee: ABB Research Ltd., Zurich, Switzerland

[21] Appl. No.: 08/999,252

[22] Filed: Dec. 29, 1997

[30] Foreign Application Priority Data

Dec. 30, 1996 [DE] Germany ................ 196 54 687

[51] Int. Cl.[7] .................................................. H01B 17/16
[52] U.S. Cl. ................ 174/168; 174/209; 52/40
[58] Field of Search .................... 174/168, 135, 174/179, 209, 45 R, 40 R, 43, 145, 146, 154, 158 R, 163 R, 196; 52/40

[56] References Cited

U.S. PATENT DOCUMENTS

| | | | |
|---|---|---|---|
| 3,439,107 | 4/1969 | Scott | 174/45 R |
| 3,935,689 | 2/1976 | Bladholm et al. | 52/721.2 |
| 4,314,434 | 2/1982 | Meisberger | 52/736.2 |
| 4,625,839 | 12/1986 | Cockburn et al. | 191/40 |
| 4,701,577 | 10/1987 | Bourrieres . | |
| 5,081,804 | 1/1992 | Andersson et al. | 52/40 |
| 5,877,453 | 3/1999 | Hill | 174/179 |

FOREIGN PATENT DOCUMENTS

| | | |
|---|---|---|
| 0 204 608 A1 | 12/1986 | European Pat. Off. . |
| 0 204 607 | 7/1990 | European Pat. Off. . |
| 0 572 243 | 12/1993 | European Pat. Off. . |
| 795.322 | 3/1936 | France . |
| 1145447 | 10/1957 | France . |
| 950 237 | 10/1956 | Germany . |
| 1 792 750 | 7/1959 | Germany . |
| 1 784 738 | 9/1971 | Germany . |
| 2 408 935 | 9/1974 | Germany . |
| 3 036 629 | 5/1982 | Germany . |
| 1179950 | 2/1970 | United Kingdom ............. 174/45 |

*Primary Examiner*—Kristine Kincaid
*Assistant Examiner*—Dhiru R. Patel
*Attorney, Agent, or Firm*—Lawrence G. Kurland, Esq.; Bryan Cave

[57] ABSTRACT

The present invention relates to a pole head for supporting conductors on poles for medium- and high-voltage overhead power lines, having at least one tubular portion which has a structural function, is made of electrically insulating composite material, and is fixed to a supporting structure. Coupling flanges for supporting the electrical conductors are connected to the at least one tubular portion and are mutually spaced along the axis of the tubular portion.

29 Claims, 2 Drawing Sheets

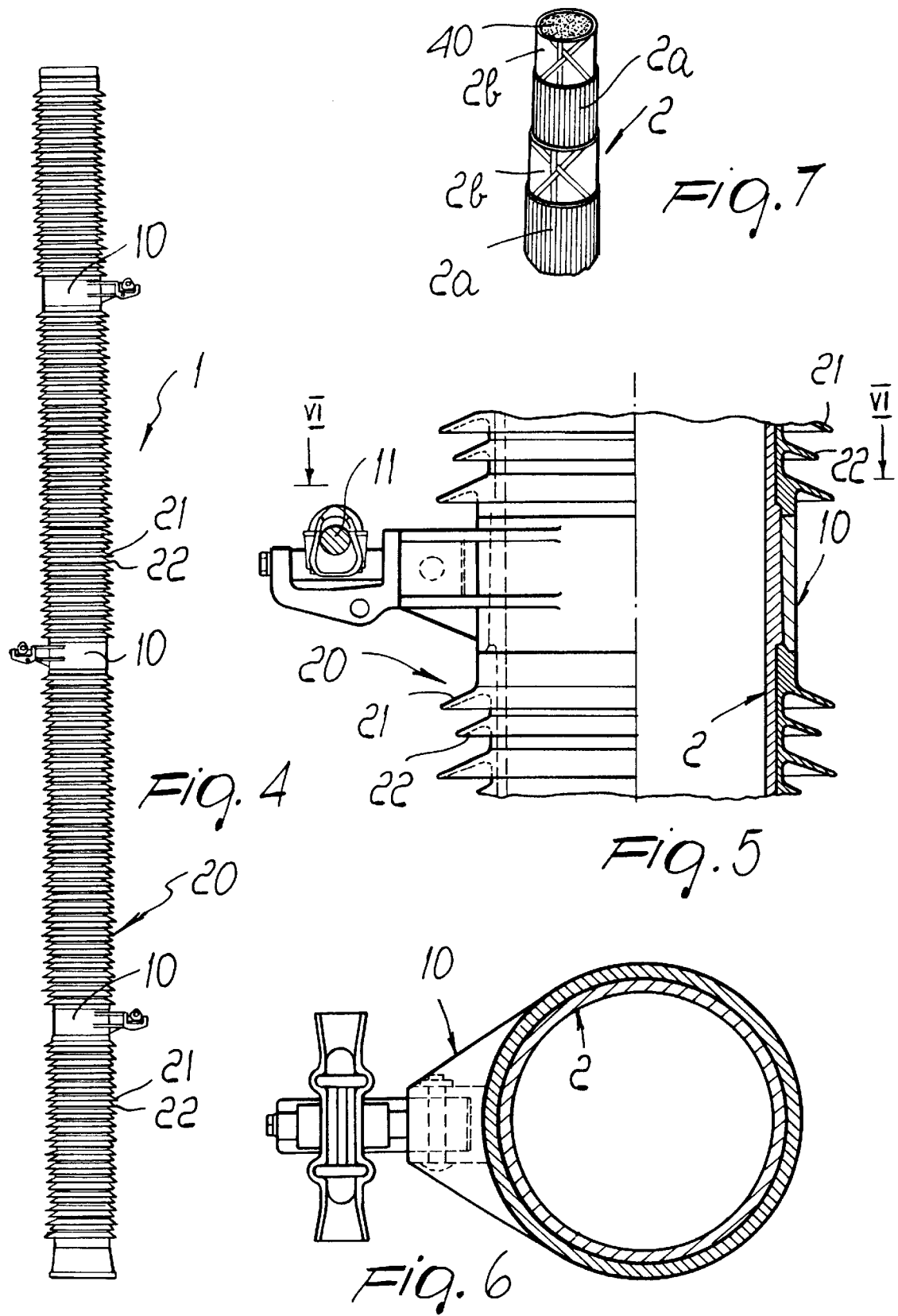

POLE HEAD FOR SUPPORTING CONDUCTORS ON POLES FOR MEDIUM- AND HIGH-VOLTAGE OVERHEAD POWER LINES

BACKGROUND OF THE INVENTION

The present invention relates to a pole head for supporting conductors and the like on poles for medium- and high-voltage overhead power lines.

It is known that the pylons normally used to support, at the height prescribed by statutory provisions, electrical conductors for medium- and high-voltage power lines are normally provided with a steel lattice-like structure which requires different structural combinations according to the contingent requirements.

One of the characteristics of these lattice-like structures, even in the most compact configurations which are used, is that they require insulators to connect the conductors to the structure.

In practice, it is necessary to provide long arms, in order to suspend the insulators, so that the corresponding conductors are kept spaced enough from the main supporting structure.

In some cases, but only for low-voltage lines, concrete poles have been provided; however, they are very heavy and furthermore, since they can absorb water on their surface, they do not allow to achieve sufficient dielectric strengths and accordingly require additional structures, such as transverse arms or the like, to support the conductors.

Fiberglass structures have already been used for small poles; however, they have mechanical strength problems in the case of high mechanical loads. These drawbacks have also been found when using pultruded tubes, since these solutions, which use unidirectional glass fibers, can easily withstand flexural loads but have low resistance to torsional loads and accordingly cannot be used to produce poles for medium- and high-voltage overhead lines.

SUMMARY OF THE INVENTION

The aim of the invention is indeed to eliminate the above described drawbacks, by providing a pole head which allows to eliminate the conventional use of porcelain or composite insulators, which are bulky and heavy and furthermore entail providing supporting structures which are very bulky and accordingly have a considerable environmental impact.

Within the scope of this aim, a particular object of the invention is to provide a pole head which allows to drastically reduce transverse space occupation and is furthermore considerably simplified as regards both construction and installation.

Another object of the present invention is to provide a pole head which can be prefabricated and transported easily to the installation site.

Another object of the present invention is to provide a pole head which by virtue of its particular constructive characteristics is capable of giving the greatest assurances of reliability and safety in use and is furthermore competitive from a purely economical point of view.

This aim, these objects, and others which will become apparent hereinafter are achieved by a pole head for supporting conductors and the like on poles for medium- and high-voltage overhead power lines, according to the invention, characterized in that it comprises at least one tubular portion made of electrically insulating composite material which is fixed to a supporting structure, coupling flanges for supporting the electrical conductors being connected to said at least one tubular portion and being mutually spaced along the axis of said at least one tubular portion.

BRIEF DESCRIPTION OF THE DRAWINGS

Further characteristics and advantages will become apparent from the description of a preferred but not exclusive embodiment of a pole head for supporting conductors and the like on poles for medium- and high-voltage overhead power lines, illustrated only by way of non-limitative example in the accompanying drawings, wherein:

FIG. 4 is a schematic view of a pole head;

FIG. 5 is an enlarged-scale and partially sectional view of the detail of the pole head for connecting the conductor coupling flanges;

FIG. 6 is a sectional view, taken along the plane VI—VI of FIG. 5; and

FIG. 7 is a schematic layer-by-layer view of the execution of the tubular element made of composite material.

DESCRIPTION OF THE PREFERRED EMBODIMENTS

Figure 3:
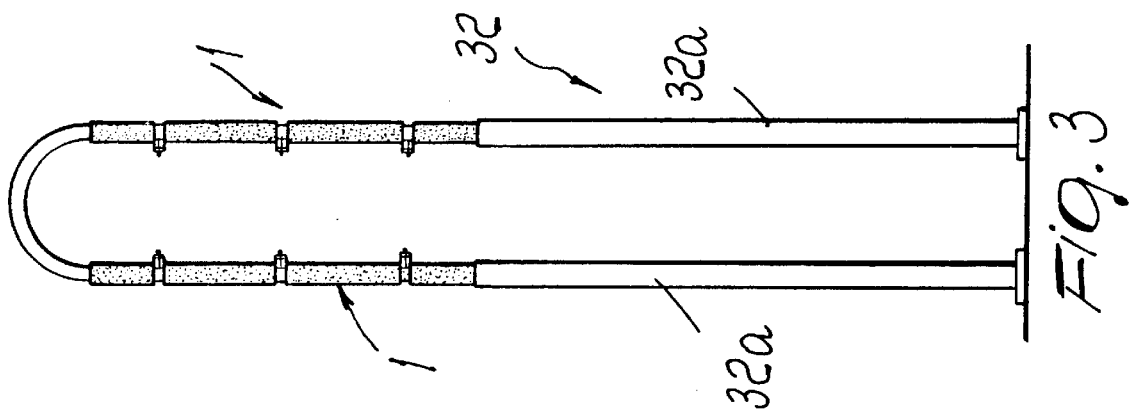
FIG. 3 is a view of an arch-shaped pole with a double head.

With reference to the above figures, the pole head for supporting conductors and the like on poles for medium- and high-voltage overhead power lines, generally designated by the reference numeral 1, is constituted by a tubular portion 2 made of electrically insulating composite material.

The tubular portion, which can be formed monolithically or by means of a plurality of tubular portions which are arranged so as to be mutually axially aligned, has the important characteristic of providing both the electrical insulation element for supporting the conductors and the element which structurally supports said conductors.

In order to achieve such mechanical strength characteristics, the tubular portion 2, which can have a cylindrical or conical shape and can be provided, in the case of multiple mutually assembled tubular portions, with different diameters according to the local stresses which it must withstand, is provided by means of an alternation of layers 2a and 2b with long fibers which are advantageously constituted by E glass fibers, or S glass fibers, or R glass fibers, or kevlar fibers embedded in an epoxy-resin matrix.

The layer 2a is made of fibers which run axially and is alternated with layers 2b which advantageously have axially-orientated fibers braided with fibers which wind in helical patterns having a constant angle on the corresponding cylindrical surfaces, some in one direction and some in the opposite direction.

The axial layers and the braided ones alternate so as to provide a stratification which is as uniform as possible in accordance with the value assigned to the percentage of axial layers, referenced by $P_a$. It should in fact be noted that the axial layers specifically withstand bending moments, whilst the torques are better withstood by the braided layers.

It has been observed that the best results for achieving resistance to the maximum loads that affect a medium- and high-voltage line, while having a tube diameter and thickness which are not excessive, is achieved by having a percentage $P_a$ of axial layers which is between 0% (zero)

and 80%, with braided layers with an angle a of the helix, relative to the axis, which is between 10° and 50°.

As mentioned above, the loads which affect the pole head generate intense bending moments and more modest torques; the bending moment generates stress components which are normal to the axial direction, so that the axial layers contribute mainly to provide flexural strength, whilst the torque generates stress components which are normal to the direction which lies at 45° with respect to the axis, so that the braided layers in which the fibers are at an angle with respect to the axis mainly contribute to torsional strength.

The braided layers furthermore help to give stability to the compressed axial fibers; the more the alternation of the two types of layer is uniform and fine, the more effectively this stability is provided.

The intensity of the flexural loads in the case of high voltages is such as to require a significant percentage of axial layers, whilst the torsional loads and the stability of the fibers in any case require braided layers which do not have excessively small wrap angles.

Flanges 10 are connected directly to the pole head 1, can be made of metallic or insulating material, and are spaced from the head along the axial direction so as to comply with the required distances between the various wires in order to prevent electrical discharge.

Each conductor 11 is supported by a short arm, which is as short as possible in order to minimize cantilevering and accordingly minimize induced stresses.

A cladding 20 of silicone rubber or the like is advantageously provided on the pole and is advantageously obtained by virtue of inclined annular flaps 21 and 22, with mutually different diameters, which alternate so that each smaller-diameter flap is flanked by a pair of larger-diameter flaps and vice versa.

This technical solution with inclined annular flaps ensures the best protection against the deposition of pollutants on the surface of the flap; moreover, the alternation of flaps having two different diameters allows to have a longer drip distance between stacked flaps for an equal number of gap lines with respect to a solution having flaps with the same diameter.

Figure 1:
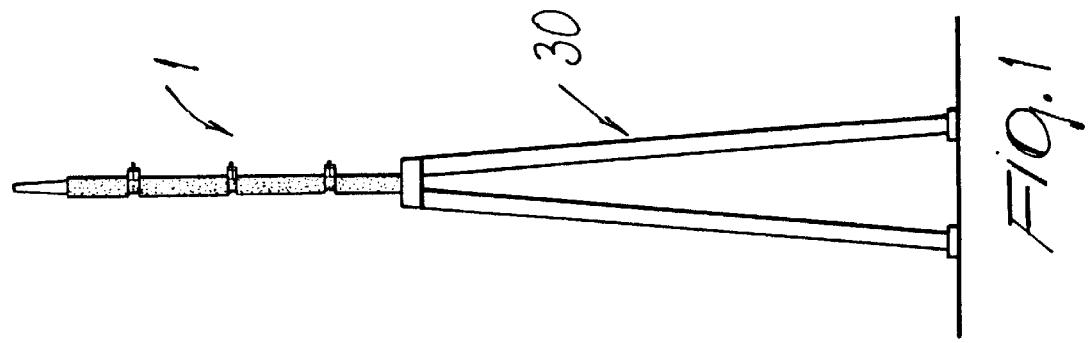
FIG. 1 is a view of an arrow-shaped pole with the pole head according to the invention.

As shown in FIG. 1, the tube 2 can be fixed to a supporting structure 30 of the arrow-shaped type, in which the pole head 1, together with the corresponding flanges 10, is supported vertically, being connected to one of its axial ends.

Figure 2:
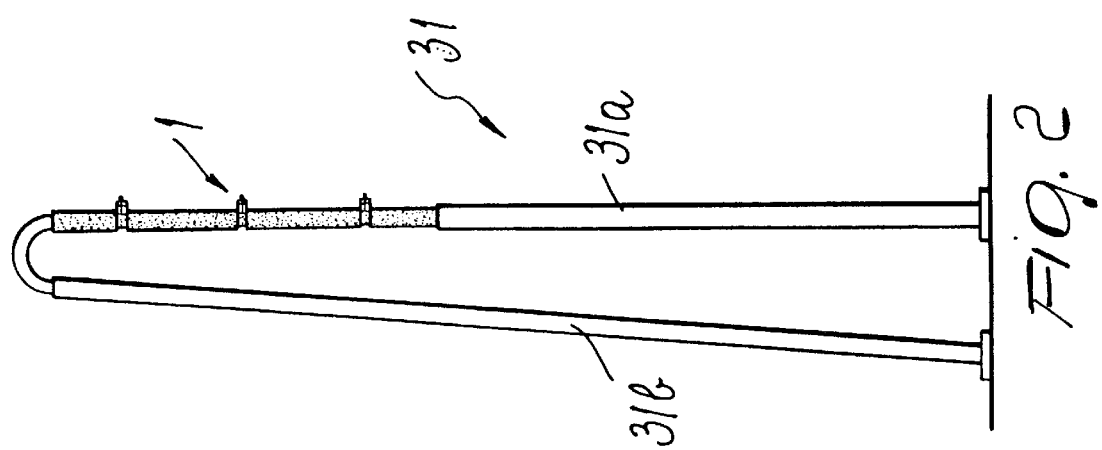
FIG. 2 is a view of an arch-shaped pole with a single head.

FIG. 2 illustrates an arch-shaped solution 31, in which the pole head made of electrically insulating composite material is arranged vertically and is inserted in an arch formed on two metal posts 31a and 31b having different lengths, the longest of which, 31b in the specific example, can optionally be inclined.

FIG. 3 illustrates a pole with an arch-like configuration and with a double head, in which there are provided two heads formed by means of tubular portions 2 which are arranged vertically and inserted in an arch formed by two metal posts 32a of equal length which are joined in an upward region.

It should be added to the above that it is optionally possible to fill the tubular portion with polymeric material having an insulating function, designated by the reference numeral 40, so as to prevent formation of condensation generated by humidity on the inner walls of the tube.

The polymeric material has properties which provide electrical insulation, low density, ability to adhere to the inner walls with sufficient flexibility, so as to follow any elastic deformations without breakage, cracking, or separation from the walls.

The polymeric material can be provided in the form of closed-cell foam, such as for example polyurethane or silicone foams.

As an alternative, the material may be in the form of a gel or of a flexibilized resin, preferably of the silicone or polyurethane type.

The material may receive the addition of convenient substances, so that it has self-extinguishing characteristics.

From the above description it is thus evident that the invention achieves the intended aim and objects, and in particular the fact is stressed that the use of a pole head made of glass-fiber composite rather than ceramic material has the advantage that the specific strength of the composite material, i.e., the ratio between strength and relative density, and the specific rigidity of said material, i.e., the ratio between the rigidity and the relative density, are distinctly greater than those of porcelain, so that for an equal load a porcelain insulated head is much more bulky and heavy than a composite head.

Porcelain is furthermore much more fragile, due to its limited resilience, and accordingly a porcelain pole head is more delicate to handle during installation and less resistant to acts of vandalism or to exceptional natural events in operating conditions, such as earthquakes.

Furthermore, the choice of long-fiber composite materials allows to optimize the mechanical strength and rigidity characteristics together with the presence of the braided fibers, which allow high resistance to torque.

Based on the above, it is therefore possible to provide a pole head which, by allowing to eliminate conventional insulators, allows, even for medium- and high-voltage lines, to support the conductors with very short horizontal arms which are spaced axially from each other, thus allowing a considerable reduction in the bulk of the pole structure and accordingly allowing a much more limited environmental impact.

The invention thus conceived is susceptible of numerous modifications and variations, all of which are within the scope of the same inventive concept.

All the details may furthermore be replaced with other technically equivalent elements.

In practice, the materials employed, so long as they are compatible with the specific use, as well as the contingent shapes and dimensions, may be any according to requirements.

What is claimed is:

1. Pole head for supporting conductors on poles for medium- and high-voltage overhead power lines, according to the invention, comprising at least one tubular portion which has a structural function, is made of electrically insulating composite material, and is fixed to a supporting structure, coupling flanges for supporting the electrical conductors being connected to said at least one tubular portion and being mutually spaced along the axis of said at least one tubular portion, wherein said at least one tubular portion is provided by means of layers with long fibers which run longitudinally and are alternated with braided layers having fibers which run substantially longitudinally with fibers which run along helical patterns.

2. Pole head according to claim 1, further comprising a plurality of tubular portions which are arranged so as to be mutually axially aligned.

3. Pole head according to claim 2, wherein said tubular portions have diameters which mutually differ according to stress to which said pole is subjected.

4. Pole head according to claim 1, wherein said tubular portion has a substantially cylindrical shape.

5. Pole head according to claim 1, wherein said at least one tubular portion has a conical shape.

6. Pole head according to claim 1, wherein the percentage in which said layers which run longitudinally are present in said at least one tubular portion is between 0% (zero) and 80%.

7. Pole head according to claim 1, wherein said braided layers have braided fibers which form an angle $\alpha$ of 10° to 50° with respect to the axis of said tubular portion.

8. Pole head according to claim 1, wherein said flanges further comprising a plurality of flanges for supporting the conductors, said flanges associated with said at least one tubular portion.

9. Pole head according to claim 1, further comprising, on said at least one tubular portion, at least one cladding constituted by a plurality of annular flaps which are inclined and arranged side by side.

10. Pole head according to claim 9, wherein said inclined annular flaps have alternating and mutually different diameters, with smaller-diameter flaps flanked by two larger-diameter flaps.

11. Pole head according to claim 9, wherein said cladding is made of silicone rubber.

12. Pole head according to claim 1, wherein said supporting structure has two uprights which form a supporting footing for said at least one tubular portion.

13. Pole head according to claim 1, wherein said supporting structure has an arch-like configuration provided on a first post, said first post having a first length, and a second post, said second post having a second length, wherein said second length is shorter than said first length, said at least one tubular portion being interposed on said second post.

14. Pole head according to claim 1, wherein said supporting structure has two metallic posts of equal length which are mutually joined and on each of which said at least one tubular portion is interposed.

15. Pole head according to claim 1 further comprising a filling constituted by polymeric material inserted in said at least one tubular portion.

16. A pole head for supporting electrical conductors on poles for medium- and high-voltage overhead power lines, comprising a plurality of tubular portions which are arranged so as to be axially aligned and have a structural function, are made of electrically insulation composite material, and are fixed to a supporting structure, coupling flanges for supporting the electrical conductors being connected to said tubular portions and being mutually spaced along the axes of said tubular portions.

17. The pole head according to claim 16, wherein said tubular portions have a substantially cylindrical shape.

18. The pole head according to claim 16, wherein said tubular portions have a conical shape.

19. The pole head according to claim 16, wherein said tubular portions have different diameters.

20. The pole head according to claim 16, wherein said tubular portions are provided by means of alternating layers comprising long fibers, with one of said alternating layers comprising fibers which run axially, and the other of said alternating layers comprising axial fibers braided with other fibers which wind in helical patterns.

21. The pole head according to claim 20, wherein the percentage in which said layers which run longitudinally are present in at least one tubular portions is between 0% (zero) and 80%.

22. The pole head according to claim 20, wherein said braided layers have braided fibers which form an angle $\alpha$ of 10° to 50° with respect to the axes of said tubular portions.

23. The pole head according to claim 16, further comprising, on said tubular portions, at least one cladding constituted by a plurality of annular flaps which are inclined and arranged side by side.

24. The pole head according to claim 23, wherein said inclined annular flaps have alternating and mutually different diameters, with smaller-diameter flaps flanked by two larger-diameter flaps.

25. The pole head according to claim 23, wherein said cladding is made of silicone rubber.

26. The pole head according to claim 16, wherein said supporting structure has two uprights which form a supporting footing for said tubular portions.

27. The pole head according to claim 16, wherein said supporting structure has an arch-like configuration provided on two posts having different lengths, one of said two posts being shorter than the other post, said tubular portions being interposed on the shorter post.

28. The pole head according to claim 16, wherein said supporting structure has two metallic posts of equal length which are mutually joined and on each of which said tubular portions are interposed.

29. The pole head according to claim 16 further comprising a filling constituted by polymeric material inserted in said tubular portions.

* * * * *

UNITED STATES PATENT AND TRADEMARK OFFICE
CERTIFICATE OF CORRECTION

PATENT NO.   : 6,031,187
DATED        : February 29, 2000
INVENTOR(S)  : Roberto GIAMPIERETTI; Cesare GUIDA; Andrea CATENACCI It is certified that error appears in the above-identified patent and that said Letters Patent is hereby corrected as shown below:

In claim 8, column 5, line 11, delete "comprising" and insert therefor --comprises--.

In claim 21, column 6, line 16, after "one", insert --of said--.

Signed and Sealed this

Sixteenth Day of January, 2001

Attest:

Q. TODD DICKINSON

*Attesting Officer*          *Commissioner of Patents and Trademarks*